United States Patent
Bhushan K N et al.

(10) Patent No.: US 7,194,606 B2
(45) Date of Patent: Mar. 20, 2007

(54) METHOD AND APPARATUS FOR USING PREDICATES IN A PROCESSING DEVICE

(75) Inventors: Keerthi Bhushan K N, Bangalore (IN); Arijit Chatterjee, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 10/953,808

(22) Filed: Sep. 28, 2004

(65) Prior Publication Data
US 2006/0095742 A1    May 4, 2006

(51) Int. Cl.
G06F 9/38 (2006.01)
(52) U.S. Cl. .................................................. 712/226
(58) Field of Classification Search ................ 712/226, 712/234; 717/151, 159
See application file for complete search history.

(56) References Cited

U.S. PATENT DOCUMENTS

| | | | | |
|---|---|---|---|---|
| 5,471,593 A * | 11/1995 | Branigin | ...................... | 712/235 |
| 6,009,512 A * | 12/1999 | Christie | ...................... | 712/226 |
| 6,075,937 A * | 6/2000 | Scalzi et al. | ................... | 703/23 |
| 6,367,076 B1 * | 4/2002 | Imai et al. | ................... | 717/152 |
| 6,834,383 B2 * | 12/2004 | Gillies et al. | ................ | 717/151 |
| 7,000,226 B2 * | 2/2006 | Gao et al. | .................... | 717/136 |
| 7,017,032 B2 * | 3/2006 | Wilson | ........................ | 712/226 |

* cited by examiner

*Primary Examiner*—Eric Coleman
(74) *Attorney, Agent, or Firm*—Ladas & Parry LLP (57) ABSTRACT

A method of controlling an operation of a processing device that comprises at least a first and second predicate execution registers comprises predicating a first instruction on the first predicate execution register. A second instruction is predicated on the second predicate execution register. The first predicate execution register is set based on a condition. The second predicate execution register is set to an inverse of the first of the predicate execution registers.

25 Claims, 6 Drawing Sheets

METHOD AND APPARATUS FOR USING PREDICATES IN A PROCESSING DEVICE

FIELD OF THE INVENTION

The present invention relates to a method and apparatus for using predicates in a processing device. The invention can be used to translate computer instructions and in particular to translating computer instructions from a non predicate based instruction set architecture to a predicate based instruction set architecture.

BACKGROUND OF THE INVENTION

There are many computer software applications written in one language and compiled for a particular microprocessor Instruction Set Architecture (ISA). Sometimes, when new computer hardware is purchased to replace old hardware it involves a change in class of microprocessor, which can mean a change in ISA. It is desirable in some situations to translate compiled binary code from one ISA to another without the need to recompile a legacy software application for the new ISA.

It is known to use a binary translator to perform this task. In some instances one ISA will have different capabilities to deal with certain types of instruction. Of particular concern to this invention is the different ways some ISAs deal with conditional instructions. The manner of dealing with conditional instructions can be a significant factor in the microprocessor's efficiency at executing code.

Some Reduced Instruction Set Computing (RISC) processors, such as Hewlett-Packard's PA-RISC, provide capabilities of dynamically changing an execution path by conditionally nullifying instructions. If the execution of an instruction results in a certain condition, the following instruction may be nullified automatically based on this condition. The condition is usually specified in the instruction which may produce the condition and always immediately precedes the instruction which may have to be nullified.

Other processors, such as Intel's Itanium Processor (which uses the IA-64 instruction set), provides predication of instructions. Predication converts control dependency into data dependency by setting Boolean predicate registers upon satisfying a condition. The predicate registers can prefix most IA-64 instructions. When the predicate register prefixing an instruction is set to FALSE the instruction's updates are suppressed, making it behave like a no-operation (nop) instruction.

Because of the different approach an ISA which is based on nullification (nullification based instruction set architecture or NBISA) has when compared an ISA which is based on predication (predication based instruction set architecture or PBISA), dealing with translating from NBISA to PBISA is difficult and is traditionally very expensive in terms of use of predicate registers.

SUMMARY OF THE INVENTION

A method of controlling an operation of a processing device that comprises at least two predicate execution registers, the method comprising the steps of:
  associating a first of the predicate execution registers with an instruction;
  associating a second of the predicate execution registers with another instruction;
  setting the first of the predicate execution registers based on a condition; and
  setting the second of the predicate execution registers to an inverse of the first of the predicate execution registers.

A method of controlling an operation of a processing device that comprises at least a first and second predicate execution registers, the method comprising the steps of:
  predicating a first instruction on the first predicate execution register;
  predicating a second instruction on the second predicate execution register;
  setting the first predicate execution register based on a condition; and
  setting the second predicate execution register to an inverse of the first of the predicate execution registers.

In one embodiment the condition is determined before the first instruction executes. Preferably the method further comprises setting the first and second predicate execution registers based on another condition determined before the second instruction executes. Preferably the other condition is determined by the execution of the first instruction.

According to the present invention there is a method of controlling an operation of a processing device that comprises at least two predicate execution registers, the method comprising:
  determining a condition;
  setting a first of the predicate execution registers to a first state based on the condition;
  setting a second of the predicate execution registers to a second state which is different to the first state;
  suppressing determination of another condition on the first predicate execution register, such that the determination of the other condition is suppressed in the event that the first predicate register is in the first state; and
  determining the other condition, setting the first predicate execution register to the second state based on the other condition and setting the second predicate execution register to the first state, in the event that the determination of the other condition is not suppressed.

Typically one or more processing device instructions are suppressed based on the second predicate execution register.

The second state will typically be in the inverse of the first state.

According to the present invention there is a method of translating instructions in code executable on a nullification based instruction set architecture (NBISA) into predicate based instruction set architecture (PBISA) instructions, comprising:
  converting a nullifying NBISA instruction into one or more semantically equivalent PBISA instructions, wherein one of the instructions sets a first predicate register to a first state in the event that a condition is met;
  predicating all PBISA instructions converted from a NBISA instruction immediately following the nullifying NBISA instruction to one or more semantically equivalent PBISA instructions, such that the PBISA instructions will be suppressed if the first predicate register is set to a second state;
  converting subsequent nullifying NBISA instructions into a group of one or more semantically equivalent PBISA instructions, wherein one of the instructions in each group of instructions sets a selected predicate register to the first state in the event that a condition is met, the selected predicate register being one of the first predicate register or a second predicate register; and predicating all corresponding PBISA instructions converted from a NBISA instruction immediately following the respective subsequent nullifying NBISA instruction to one or more corresponding semantically equivalent instructions, such that the corresponding PBISA instructions will be suppressed if the respective selected predicate register is set to the first state;

wherein the respective predicate register is selected such that the same predicate register is not selected in a row where one nullification instruction is immediately followed by another.

In one embodiment the respective predicate register is selected by alternating the predicate register selected with each nullification instruction.

In another embodiment the respective predicate register is selected by alternating the predicate register selected for pairs of nullification instructions, but for non paired nullification instructions the first predicate register is selected.

In another embodiment the respective predicate register is selected by alternating the predicate register selected for pairs of nullification instructions, but for non paired nullification instructions the second predicate register is selected.

According to the present invention there is a method of translating instructions in code executable on a nullification based instruction set architecture (NBISA) into predicate based instruction set architecture (PBISA) instructions, comprising:

providing at least one nullifying NBISA instruction in the code;

converting each nullifying NBISA instructions into one or more semantically equivalent PBISA instructions, wherein one of the instructions sets a selected predicate register to a first state in the event that a condition is met, the selected predicate register being one of a first predicate register or a second predicate register; and predicating all corresponding PBISA instructions converted from a NBISA instruction immediately following the respective nullifying NBISA instruction to one or more corresponding semantically equivalent instructions, such that the corresponding PBISA instructions will be suppressed if the respective selected predicate register is set to the first state;

wherein the respective predicate register is selected such that the same predicate register is not selected in a row where one nullification instruction is immediately followed by another.

Also according to the present invention there is a method of translating NBISA instructions into PBISA instructions, where there are at least two sequential nullifying instructions, comprising:

providing at least two sequential nullifying NBISA instructions (first and second instructions) and a third NBISA instruction immediately following the first and second instructions;

determining one or more first PBISA instructions semantically equivalent to the first NBISA instruction, wherein the first determined instructions comprise a PBISA instruction which upon execution sets a first predicate register to a first state if a condition is met;

determining one or more second PBISA instructions semantically equivalent to the second NBISA instruction, wherein the second determined instructions comprise a PBISA instruction which upon execution sets a second predicate register to a second state if another condition is met;

predicating the second determined instructions on the first predicate register, such that the second determined instructions do not execute in the event that the first predicate register is set to the first state at the time of execution;

determining one or more third PBISA instructions semantically equivalent to the third NBISA instruction; and predicating the third determined instructions on the second predicate register, such that the third determined instructions do not execute in the event that the second predicate register is set to the second state at the time of execution.

Typically the second predicate register is set to inverse of the first state when the first predicate register is set. Typically the first predicate register is set to the inverse of the second state when the second predicate register is set. Typically the first state is FALSE. Typically the second state is FALSE.

Typically if the respective condition is not met the respective predicate registers are set to the opposite setting when the condition is met upon execution of the respective instruction.

Each instruction predicated by the corresponding predicate register will only execute in the event that the respective predicate register is TRUE at the time of execution.

In one embodiment in the step of determining the third PBISA instruction(s) semantically equivalent to the third NBISA instruction, the third determined instructions comprise a PBISA instruction which upon execution sets a first predicate register to the first state in the event that the third NBISA instruction is a nullifying instruction.

In an embodiment, where subsequent NBISA instructions include two sequential nullifying instructions (fourth and fifth instructions) immediately followed by a sixth instruction, the method further comprises:

determining one or more fourth PBISA instructions semantically equivalent to the fourth NBISA instruction, wherein the fourth determined instructions comprise a PBISA instruction which upon execution sets the first predicate register to a first state if a condition is met;

determining one or more fifth PBISA instructions semantically equivalent to the fifth NBISA instruction, wherein the fifth determined instructions comprise a PBISA instruction which upon execution sets the second predicate register to the second state if another condition is met;

predicating the fifth determined instructions on the first predicate register, such that the fifth determined instructions will not execute in the event that the first predicate register is set to the first state at the time of execution;

determining one or more sixth PBISA instructions semantically equivalent to the sixth NBISA instruction; and predicating the sixth determined instructions on the second predicate register, such that the sixth determined instructions will not execute in the event that the second predicate register is set to the second state at the time of execution.

In the same embodiment, where subsequent NBISA instructions include a nullifying instruction (fourth instruction) immediately followed by a non nullifying instruction (fifth instruction), the method further comprises:

determining one or more fourth PBISA instructions semantically equivalent to the fourth NBISA instruction, wherein the fourth determined instructions comprise a PBISA instruction which upon execution sets the first predicate register to the first state if another condition is met;

determining one or more fifth PBISA instructions semantically equivalent to the fifth NBISA instruction; and predicating the fifth determined instructions on the first predicate register, such that the fifth determined instructions will not execute in the event that the first predicate register is set to the first state at the time of execution.

In another embodiment, typically at least a fourth NBISA instruction immediately follows the first three NBISA instructions. In this embodiment the method further comprises:

inspecting the third of the NBISA instructions to determine if it is an instruction which nullifies the fourth instruction if a condition is met, wherein in the step of determining third semantically equivalent PBISA instruction(s) to the third NBISA instruction, the third determined instructions comprise a PBISA instruction which upon execution sets the first predicate register to the first state if another condition is met in the event that the third NBISA instruction is nullifying; and determining one or more fourth PBISA instructions semantically equivalent to the fourth NBISA instruction; and predicating the fourth determined instructions on the first predicate register in the event that the third NBISA instruction is nullifying, such that the fourth determined instructions will not execute in the event that the first predicate register is set to the first state at the time of execution.

According to the present invention there is a method of translating NBISA instructions into PBISA instructions, comprising:

providing at least three sequential NBISA instructions;

inspecting the first of the NBISA instructions to determine if it is an instruction which nullifies the second NBISA instruction if a condition is met;

determining one or more first PBISA instructions semantically equivalent to the first NBISA instruction, wherein the first determined instructions comprise a PBISA instruction which upon execution sets a first predicate register to a first state if a condition is met in the event that the first NBISA instruction is nullifying;

inspecting the second of the NBISA instructions to determine if it is an instruction which nullifies the third NBISA instruction if a condition is met;

determining one or more second PBISA instructions semantically equivalent to the second NBISA instruction, wherein the second determined instructions comprise a PBISA instruction which upon execution sets a second predicate register to the second state if another condition is met in the event that the second NBISA instruction is nullifying;

predicating the second determined instructions on the first predicate register in the event that the first NBISA instruction is a nullifying instruction, such that the second determined instructions will not execute in the event that the first predicate register is set to the first state at the time of execution;

determining third semantically equivalent PBISA instruction(s) to the third NBISA instruction; and predicating the third determined instructions on the second predicate register in the event that the second NBISA instruction is a nullifying instruction, such that the third determined instructions will not execute in the event that the second predicate register is set to the second state at the time of execution.

According to the present invention there is provided a method of translating NBISA instructions to PBISA instructions, comprising:

identifying pairs of nullification instructions such that a pair of nullification instructions is where there are two nullification instructions in a row and counting of pairs begins at the first nullification instruction;

converting the first nullification instruction of each pair into first semantically equivalent PBISA instructions, which comprise a conditional instruction that sets a first predicate register to a first state if a condition is met;

converting the second nullification instruction of each pair into second semantically equivalent PBISA instructions comprising a conditional instruction that sets a second predicate register to a second state if a condition is met;

predicating each second PBISA instruction on the first predicate register;

predicating each next converted instruction's converted first PBISA instructions on the second predicate register where each next NBISA instruction is the first of another pair of nullification instructions; and converting the next instruction following each pair of nullification instructions into third first semantically equivalent PBISA instructions and predicating each next converted instruction's converted third PBISA instruction on the second predicate register where each next NBISA instruction is not the first of another pair of nullification instructions.

In the last step of the above method, this step comprises:

identifying whether the instruction following the pair of nullification instructions is a non paired nullification instruction;

in the event that the next NBISA instruction is a nullification instruction, but not a member of a pair of nullification instructions converting the nullification instruction into semantically equivalent PBISA instructions comprising a conditional instruction that sets the first predicate register to the first state if a condition is met and predicating the following instruction on the first predicate register.

In an embodiment the method further comprises instructions converting the remaining NBISA instructions into semantically equivalent PBISA instructions.

According to the invention there is also a computer program arranged to control a computerized system to operate one or more of the methods described above.

Also according to the present invention there is a computer readable storage medium arranged to store a computer program as defined above.

According to the invention there is an apparatus for translating nullification instructions in code executable on a NBISA into PBISA instructions, comprising:

translator means for converting nullifying NBISA instructions into one or more semantically equivalent PBISA instructions, wherein one of each of the converted instructions sets a selected predicate register to a first state in the event that a condition is met;

predication means for predicating all PBISA instructions converted to one or more semantically equivalent instructions from respective NBISA instructions immediately following the corresponding nullifying NBISA instruction, such that each set of respective converted PBISA instructions will not execute if the respective selected predicate register is set to the first state;

selection means for selecting the respective predicate register such that the same predicate register is not selected in a row where one nullification instruction is immediately followed by another.

According to the invention there is an apparatus for translating NBISA instructions into PBISA instructions, comprising:

means for receiving at least three sequential NBISA instructions, wherein the first and second instructions are nullifying instructions;

a translator arranged to determine one or more first PBISA instructions semantically equivalent to the first NBISA instruction, wherein the first determined instructions comprise a PBISA instruction which upon execution sets a first predicate register to a first state if a condition is met;

wherein the translator is also arranged to determine one or more second PBISA instructions semantically equivalent to the second NBISA instruction, wherein the second determined instructions comprise a PBISA instruction which upon execution sets a second predicate register to the first state if another condition is met;

wherein the translator is further arranged to determine one or more third PBISA instructions semantically equivalent to the third NBISA instruction;

wherein the translator is arranged to predicate the second determined instructions on the first predicate register;

wherein the translator is arranged to predicate the third determined instructions on the second predicate register.

BRIEF DESCRIPTION OF THE DRAWINGS

In order for the invention to be more readily understood, embodiments will now be described, by way of example only, with reference to the accompanying drawings, in which.

DETAILED DESCRIPTION OF THE EMBODIMENTS

According to an embodiment of the present invention, there is provided a method for translating a computer program having computer instructions natively executable on a nullification based instruction set architecture (NBISA) to a computer program having computer instructions natively executable on a predicate based instruction set architecture (PBISA). The method is performed by providing instructions in the form of translator software to control the computer of FIG. 1 to be configured as shown in FIG. 2.

Figure 1:
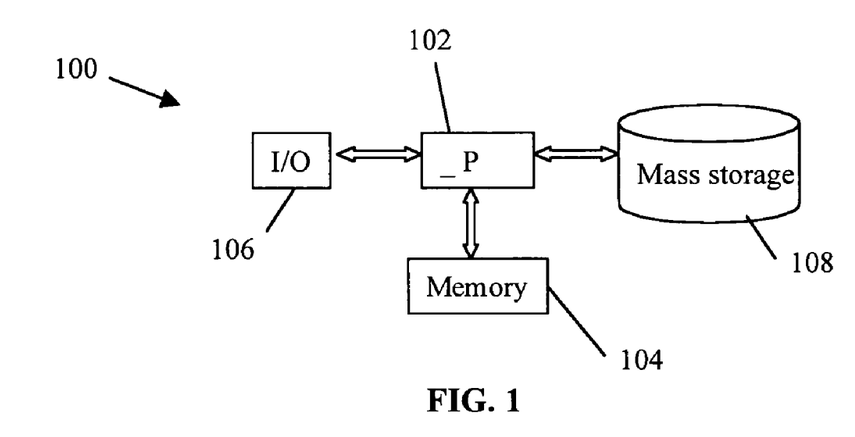
FIG. 1 is a schematic representation of computer loaded with software for carrying out the method of embodiments of the present invention.
Figure 2:
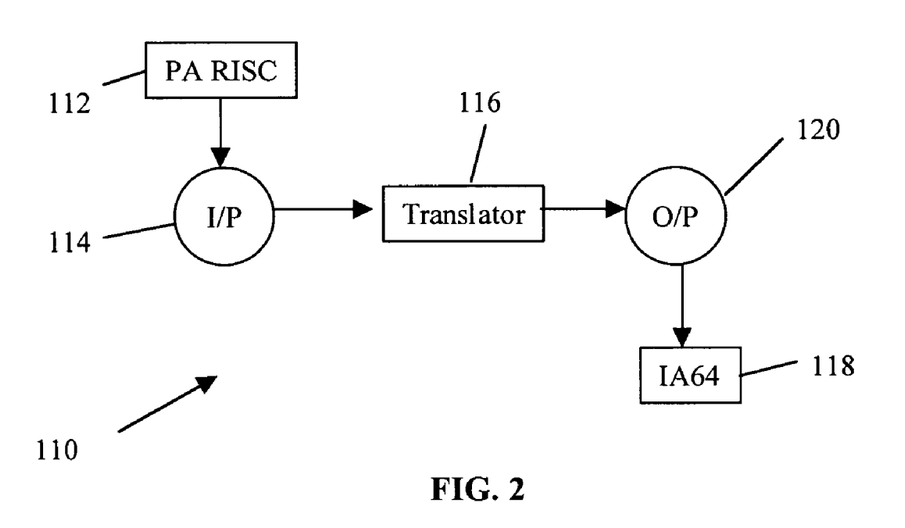
FIG. 2 is a schematic representation of a configuration of the computer of FIG. 1 for carrying out a method of embodiments of the present invention.

In FIG. 1 computer 100 comprises a microprocessor 102 operatively connected to volatile memory 104, input/output means 106 and mass storage 108. Typically the translator software is a computer program stored in mass storage 108, such as a hard disk drive and is loaded into volatile memory 104. The translator software is executed by the microprocessor 102 under the control of an operating system. Input/output 106 is used to provide interaction between a user and the computer program loaded on the computer 100 or the operating system. The translator software configures the computer 100 to operate as a translating apparatus 110 shown in FIG. 2. The translator software takes received blocks of NBISA instructions 112 from the first computer program. The first computer program is arranged to run natively on a NBISA microprocessor, such as a PA_RISC class of processor. The blocks 112 of the first computer program are sent into a translator 116 of the apparatus 110 by input 114. Input 114 controls the flow of the blocks 112 and may be in the form of an operating system running on the computer 100. The microprocessor 102 and memory 104 are configured to operate as the translator 116 which translates the blocks 112 into blocks 118 of a second computer program with a PBISA suitable for native execution on a microprocessor that can execute PBISA instructions. An example PBISA instructions is the IA64 instruction set which can run on an Intel Itanium microprocessor. The translated instructions 118 exit the translator 116 through an output which again may be in the form of an operating system to construct the second computer program.

The method of converting NBISA instructions into PBISA instructions is performed by the translator software, also called a binary translator. The binary translator can, as a stand alone event, translate native NBISA code into PBISA code thereby operating as a static binary translator. It can also operate as a static compiler for compiling NBISA code into a PBISA executable binary. The present invention is also particular useful as a dynamic binary translator (DBT) which is used to translate the NBISA binary code to PBISA binary code at run time. The DBT may operate as an interpreter. Such DBTs are used for emulation of foreign environments which may include a different processor instruction set architecture as well as environments consisting of signal and system call semantics, for dynamic recompilation virtual machines.

A DBT typically accomplishes emulation of a non native ISA by generating blocks of native code which are semantically equivalent to the blocks of code existing and the binary being translated. When the translation is from an NBISA to a PBISA, nullification is achieved by qualifying the potentially nullified instruction with a predicate which may be set to FALSE when the instruction has to be nullified.

The basic premise of an embodiment of the present invention is that only two predicate registers need be used to conduct this translation. Minimisation of predicate registers is desirable because the registers have to be filled with meaningful values before the dynamically generated code executes. The time required to fill in meaningful values is proportional to the number of registers that have to be filled. Also, code within the DBT to keep track of predicate registers including code to analyse information like data dependencies, register roll over, etc is reduced drastically. Since translation time in the DBT adds to the run time of the emulated binary the present invention provides an increased overall performance binary being emulated by the DBT on a predicated architecture.

The emulated binary will for example be something like this:

Instruction1 determine condition and set p1, p2 (p1)
  Instruction2 determine condition and set p1, p2 (p2)
  Instruction3

It will be appreciated that Instruction1, Instruction 2 and Instruction 3 may comprise sub-instructions.

Where a nullifying instruction is not followed by a further nullification instruction one of the predicate registers is used which may then be reused by another pair of nullifying instructions or another single nullifying instruction.

Where a nullifying instructions in not followed by a further nullification instruction one of the predicate registers is used which may then be reused by another pair of nullifying instructions or another single nullifying instruction.

In another embodiment the predicate registers as used in a first order for one nullification instruction then swapped in order for the next nullification instruction and then each use of the predicate registers for nullification instructions is thereafter swapped in order.

In both of these embodiments the same predicate register is not selected in a row where one nullification instruction is immediately followed by another nullification instruction. This can be achieved by using two predicate registers. While more predicate registers could be used (such as three, four or even more) and is contemplated in the present invention, this would decrease the performance benefit of only using two.

The nature of the present invention will become more clear with descriptions of embodiments of the present invention.

Figure 3:
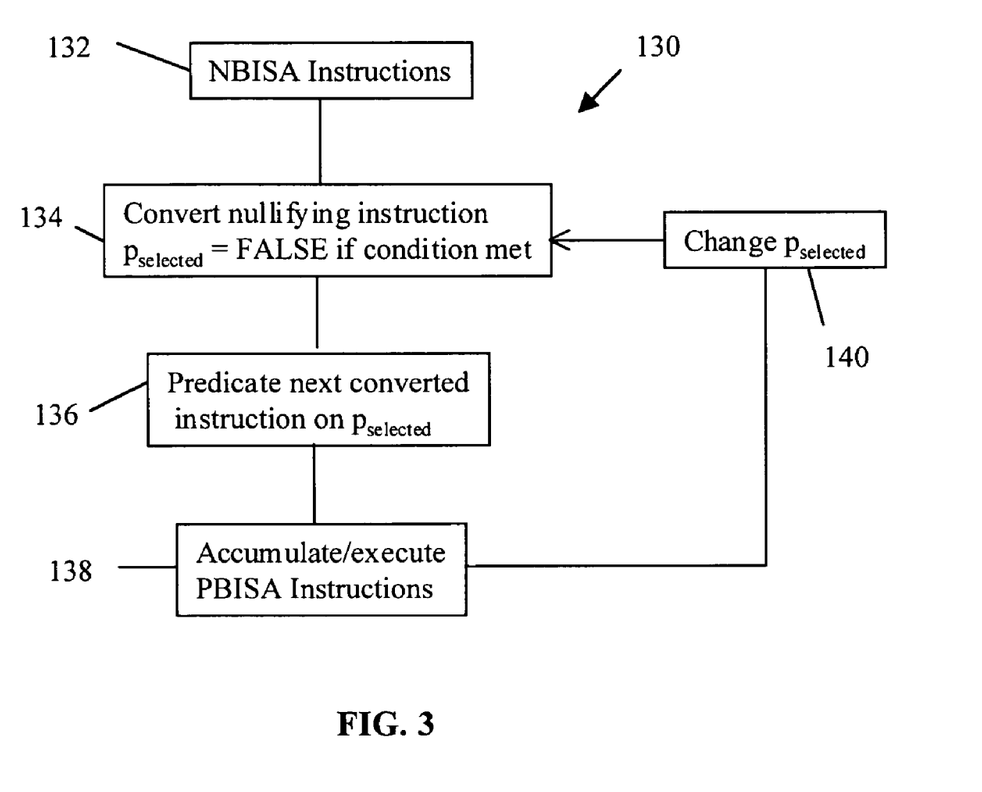
FIG. 3 is a flow chart showing a first embodiment of a method of the present invention.

Referring to FIG. 3 there is shown a simplistic overview of an embodiment of a method 130 according to the present invention. The method commences with providing at 132 code comprising NBISA instruction (such as PA_RISC instructions) 112 to the translator 116, via input 114. Nullifying NBISA instructions are converted to semantically equivalent PBISA instructions at 134. The equivalent instruction may be one or more instructions. One of the equivalent instructions is a conditional instruction, which sets a first predicate register. The first predicate register is set to a Boolean FALSE state if the condition is met and is set to a TRUE state is the condition is not met. The first predicated register is, for example, p1. It is usual for a second predicate register, for example p2, to be set to the inverse (logical NOT) of p1.

The NBISA instruction immediately following the converted NBISA instruction is converted into one or more PBISA instructions and those instructions are predicated 136 on the first predicate register. By predicating them on the first predicate register, if the condition is met in the conditional instruction the converted NBISA instruction is effectively nullified.

Where there are two nullification instructions in a row the same predicate register can not be used. The predicate register used in each conditional instruction and predication is selected so that the same predicate register is not used where there are two nullification instructions in a row. As mentioned above this is easily achieved by sequencing (or alternating) the predicate registers used.

At 138 the converted instructions are accumulated into the third program or can be used by a dynamic translator and sent for execution.

Further NBISA instructions are translated, and in particular when the next nullification instruction is reached the above described procedure is repeated. This may involve changing 140 the selected predicate register, and will definitely be the case where there are two nullification instructions in a row.

In one embodiment the selection is a simple process of alternating between p1 and p2 as the register set to FALSE if the condition is met in the conditional instruction and predication of the next converted instructions. In another embodiment it is determined whether the nullification instructions are in a pair, that is, immediately adjacent one another. In this case they are swapped in each pair. Where a nullification instruction is not immediately adjacent another one of the predicated registers, for example p1, will always be used.

The invention will be described further in relation to the following example in which a stream of NBISA instructions in the form of HP PA-Risk Instructions are converted into PBISA instructions in the form of Intel IA64 instructions.

Example PA-RISC Instruction Stream:

| Instruction No. | Instruction |
| --- | --- |
| PA_I1 | ADD,NE r24,r25,r26 // If r24 != -r25 Nullify Next |
| PA_I2 | ADD,LT r19,r24,r25 // If r19 < -r24 Nullify Next |
| PA_I3 | ADD r19,r20,r19 // Never Nullify |

Semantically Equivalent IA64 Instruction Stream:

| Instruction No. | Instruction |
| --- | --- |
|  | // Translation for PA-RISC ADD,NE r24,r25,r26 |
| IA64_I1 | add PA_r26 = PA_r24, PA_r25 ;; |
| IA64_I2 | nop |
| IA64_I3 | cmp.eq p1,p2 = PA_r26, IA_r0 ;; |
|  | // Translation for PA-RISC ADD,LT r19,r24,r25 |
| IA64_I4 | (p1)add PA_r25 = PA_r19, PA_r24 |
| IA64_I5 | sub IA_Temp1 = IA_r0 , PA_r24 ;; |
| IA64_I6 | (p1)cmp.lt p1,p2 = PA_r19, IA_Temp1;; |
|  | // Translation for PA-RISC ADD r19,r20,r19 |
| IA64_I7 | (p2)add PA_r19 = PA_r19, PA_r20 |

In the Itanium instruction Stream:
  PA_r(n) refers to the Itanium register which emulates the PA_r(n) register
  IA_* refers to other Itanium registers used
  p1/p2 are Itanium predicate registers. p1 & p2 are just examples, any predicate register (except p0) may be used instead.
  ;; refers to a stop bit
  PA_I1: This instruction adds r24 to r25 and stores the result in r26. Also, if the value in r24 is less than the value in r25, then the following instruction PA_I2 will be nullified.
  In the translation (IA64_I[1,2,3]), the emulated PA_r26 gets the sum of the emulated PA_r24 & PA_r25. To emulate the nullification, the condition is evaluated and the predicates p1 & p2 are set. The instructions which emulate PA_I2 are predicated on the resulting true predicate i.e. if the condition in IA64_I3 evaluates to true, then p1 is true and p2 to false. Thus p1 is set to FALSE if the nullification condition is true, and thus the instructions emulating PA_I2 (i.e. IA64_I[4,5,6]), being predicated on p1, are never executed, thus effectively nullified.
  Since p2 is always the complement of p1, when the nullification is met in IA64_I3 p2 is true. Thus, PA_I3 translation (i.e. IA64_I7) being predicated on p2, will be executed.

PA_I2: If the condition in PA_I1 evaluates to FALSE then PA_I2 is executed. In the translated code, the predicate register p1 would be TRUE and p2 FALSE. But, since PA_I2 is executing, the translated instruction IA64_I6 would set the value of p1 & p2 to reflect the condition embodied in instruction PA_I2.

Extrapolating this idea, IA64 code which emulates any sequence of PA-RISC instructions may be generated with all the nullification emulated by just using two Itanium registers (p1 & p2 in the example).

The assertion works because if any instruction I(n) nullifies instruction I(n+1) then instruction I(n+2) HAS TO EXECUTE. If I(n) is a branch, then I(n+2) would be the branch target since I(n+1) would be the delay slot in PA-RISC.

In a DBT while translating instruction I(n+1) the translator has to remember the output-predicate (predicate set due to evaluation of the condition in I(n)) of instruction I(n) and use that as the qualifying predicate for I(n+1). Also, it has to use the complemented predicate to predicate I(n+2) if I(n+1) is also a nullifying instruction.

In addition, when I(n+1) is a nullifying instruction, it should set the same predicate registers, but interchange the TRUE and FALSE predicates. The translation for PA_I1 (IA64_I[1,2,3]) uses p1 as the predicate which when set to TRUE means PA_I2 is not nullified and to FALSE when it is nullified. Predicate register p2 is ALWAYS the logical NOT of p1. So, when PA_I1's nullification condition is satisfied p1 is FALSE and p2 is TRUE. PA_I2 uses these predicate registers in the opposite order i.e. when PA_I2's nullification condition is true, p1 evaluates to TRUE while p2 evaluates to FALSE.

| Instruction | Nullifies? | p1 | p2 | Remarks |
|---|---|---|---|---|
| PA_I1 | No | TRUE | FALSE | PA_I2 executes |
|  | Yes | FALSE | TRUE | Since p2 is true PA_I3 automatically executes |
| PA_I2 | No | FALSE | TRUE | predicate this and swap predicate values for the next, such that EITHER PA_I3 executes because it is predicated on p2 |
|  |  |  |  | OR |
|  | Yes | TRUE | FALSE | PA_I3 gets nullified because PA_I2 would have set p2 to FALSE |

Thus, every instruction uses a predicate register to set the nullification condition which its previous instruction did not. This is efficiently achieved in an embodiment of the present invention by every instruction reversing the order of predicate registers used to define whether the nullification condition was met or not. In this fashion, the nullification of the entire generated code can be managed with just two predicate registers.

Figure 4:
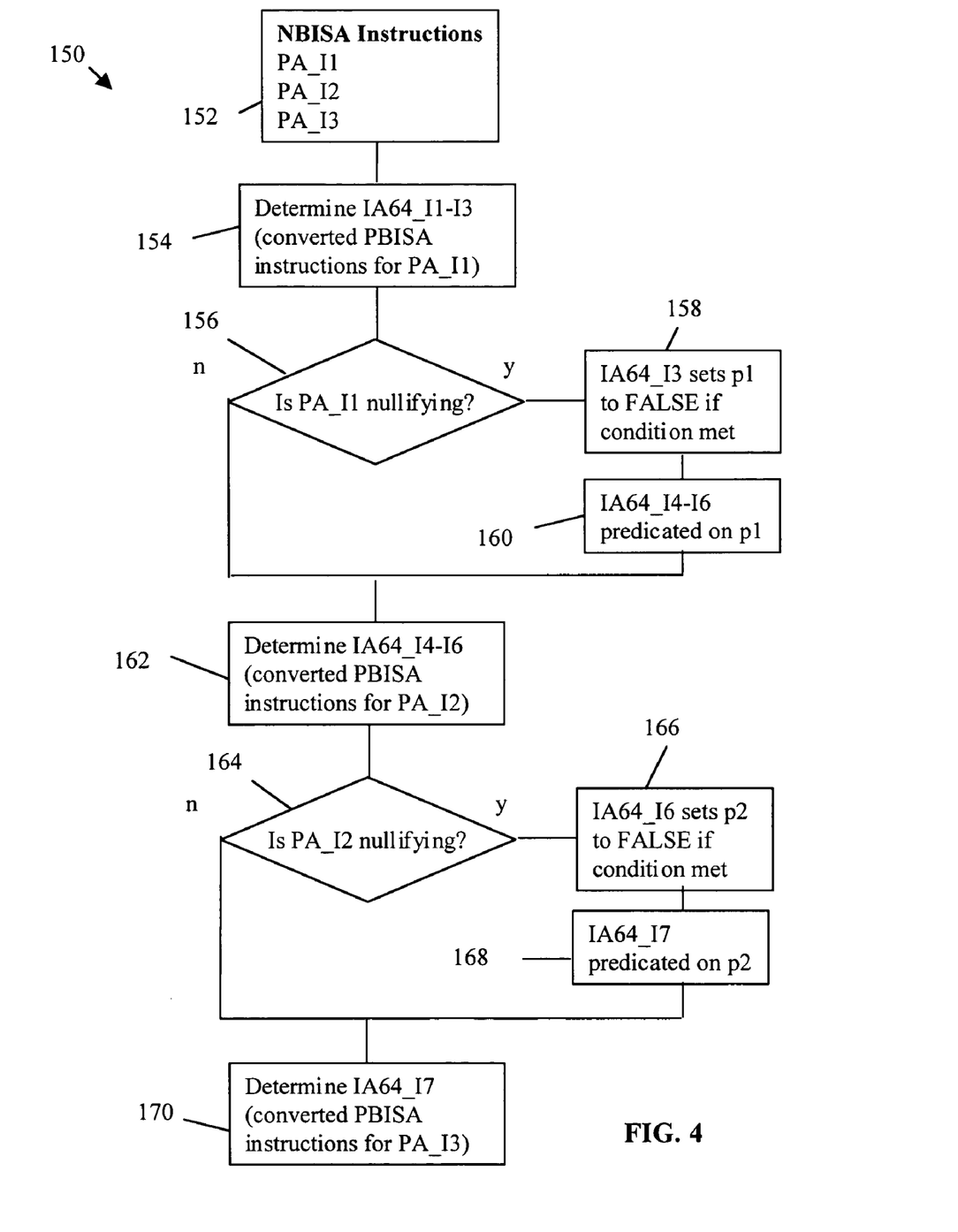
FIG. 4 is a flow chart of a second embodiment of the present invention.

A flow chart of a more detailed embodiment of a method 150 for converting the NBISA instructions in this example is shown in FIG. 4. NBISA instructions PA_I1, PA_I2 and PA_I3 are provided as a block of code to be translated at 152. Instruction PA_I1 is converted 154 to the semantically equivalent instructions IA64_I1, IA64 I2 and IA64_I3. In addition or as part of the translation process it is checked 156 to determine whether PA_I1 is nullifying. If it is not nullifying the process jumps to 162. In the above example PA_I1 is nullifying, so translated instruction IA64_I3 is a conditional instruction which sets predicate register p1 to FALSE at 158 if the condition is met. It also sets predicate register p2 to TRUE. Furthermore instructions translated from the next NBISA instruction PA_I2, namely instructions IA64_I4, IA64_I5 and IA64_I6, are predicated 160 on p1.

Instruction PA_I2 is converted 162 to the semantically equivalent instructions IA64_I4, IA64 I5 and IA64_I6. In addition or as part of the translation process it is checked 164 to determine whether PA_I2 is nullifying. If it is not nullifying the process jumps to 170. In the above example PA_I2 is nullifying, so translated instruction IA64_I6 is a conditional instruction which sets the next selected predicate, in this case p2, to FALSE at 166 if the condition is met. It also sets p1 to TRUE. Furthermore instructions translated from the next NBISA instruction, PA_I3, namely instruction IA64_I7 is predicated 168 on p2.

Instruction PA_I3 is converted 170 to the semantically equivalent instruction IA64_I7.

Swapping of the selected predicate registers occurs when there are pairs of nullification registers. A pair is defined as two nullification instructions in a row. Counting of pairs begins at the first nullification instruction. In another embodiment described in relation to FIG. 5 it is assumed that the first two instructions have been found at 182 to be a pair, that is PA_I1 and PA_I2 are a pair of nullifying instructions. In this exemplary embodiment PA I3 is a different instruction to that in the above example. It may be a nullifying instruction.

Figure 5:
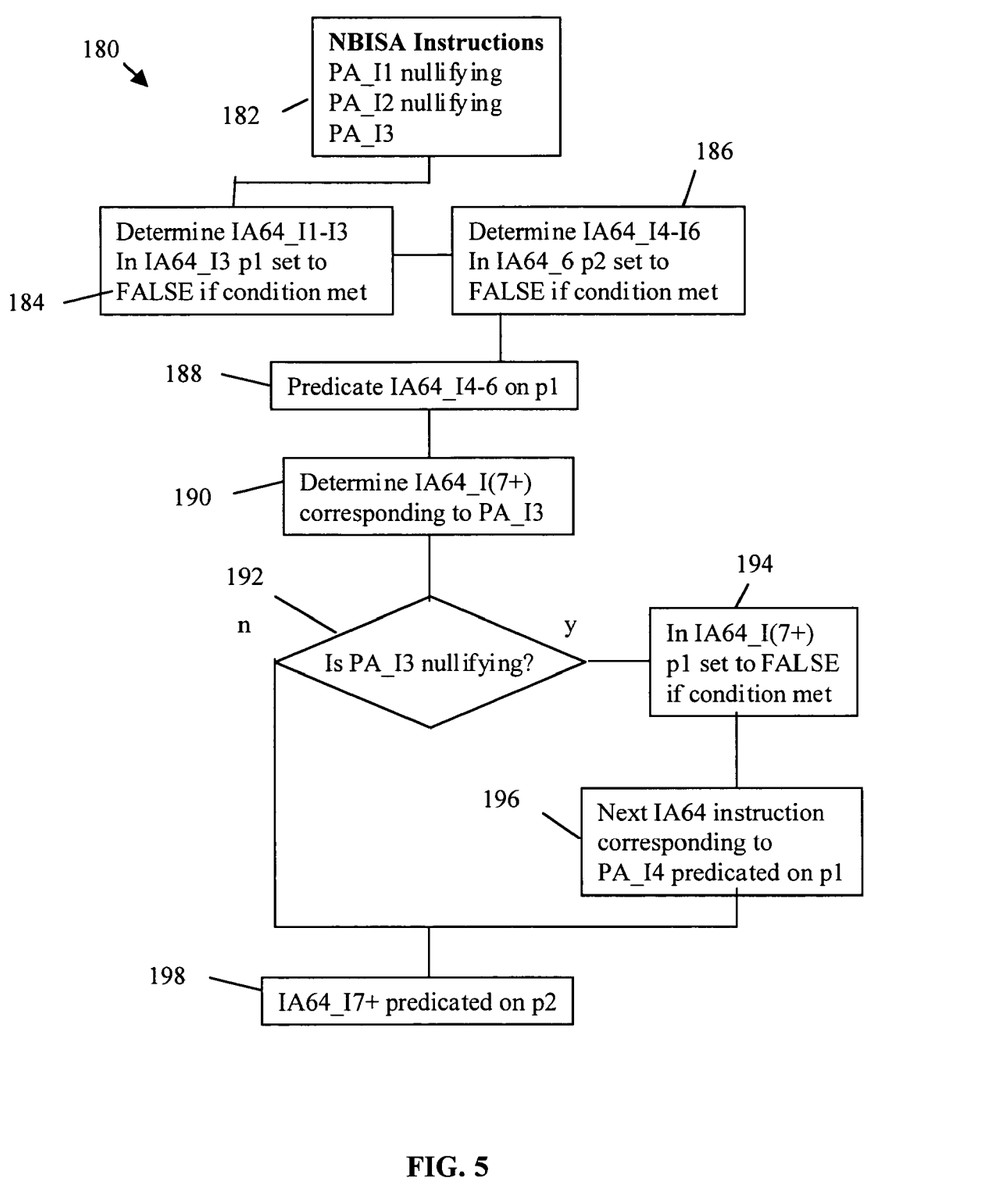
FIG. 5 is a flow chart of a third embodiment of the present invention.

At 184 instructions IA64_I1–I3 semantically equivalent to instruction PA_I1 are determined. Determined instruction IA64_I3 is a conditional instruction in which p1 is set to FALSE if the condition is met. Again the p2 may be set to TRUE if the condition is met. It is typical if the condition is not met that p1 will be set to TRUE and p2 will be set to FALSE, however this is not material in this example. At step 186 the translator determines the PBISA of PA_I2, that is converted instructions IA64_I4–6. IA64_I6 is a PBISA instruction which sets p2 to FALSE and p1 to TRUE when the condition is met. Typically the p2 is set to TRUE and p1 is set to FALSE if the condition is not met. In step 188 instructions IA64_I4–6 are predicated on p1.

At step 190 the semantically equivalent PBISA instruction(s), IA64_I7+ are determined from PA_I3. The translator then checks 192 whether NBISA instruction PA_I3 is nullifying. If PA__3 is not nullifying, then the process jumps to step 198. If it is nullifying, then the converted instruction IA64_I3 includes 194 an instruction in which the p1 is set to FALSE and p2 is set to TRUE if the condition is met. At step 196 converted instructions the next instruction (PA_I4) after PA_I3 are predicated on p1.

At step 198 instructions IA64_I7+ are predicated on p2.

Figure 6:
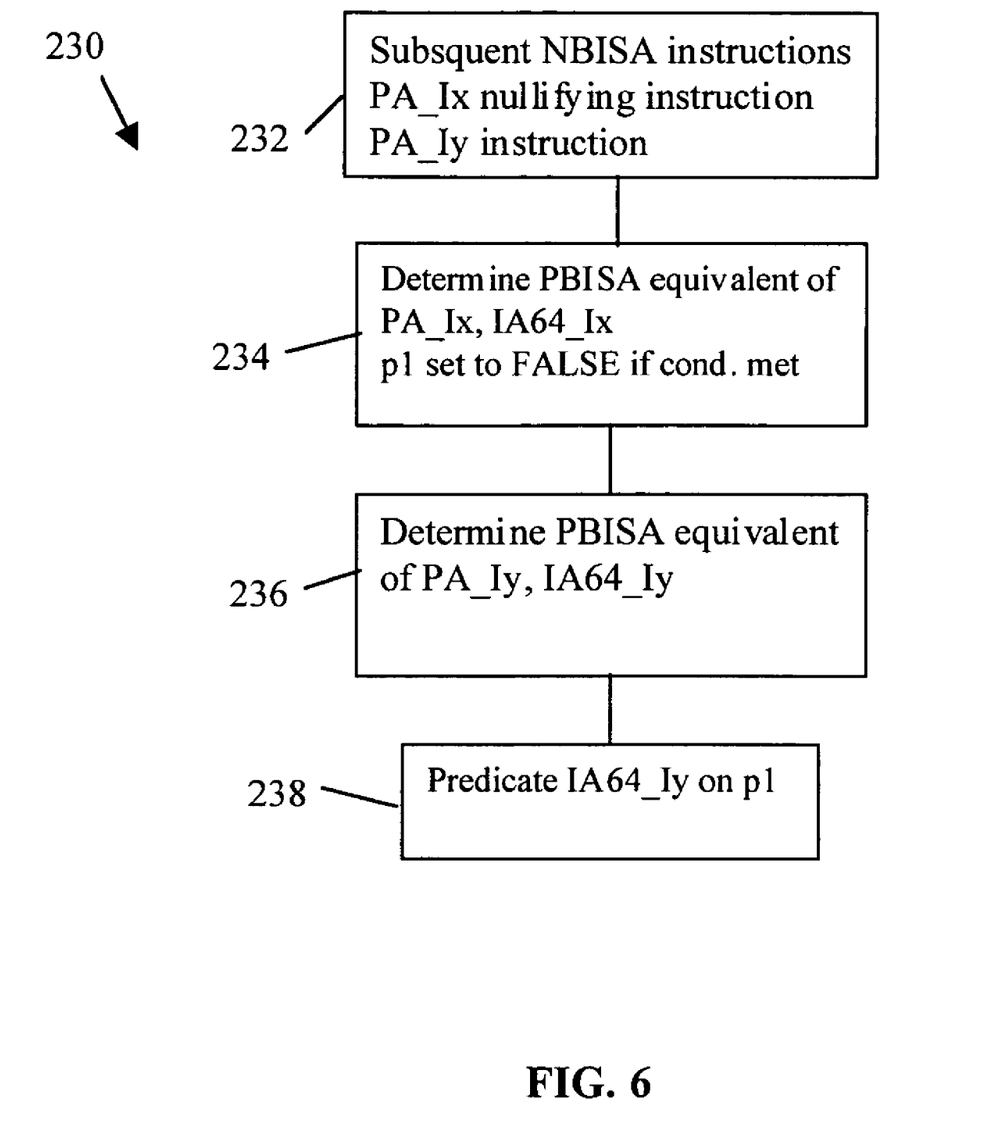
FIG. 6 is a flow chart of a fourth embodiment of the present invention.
Figure 7:
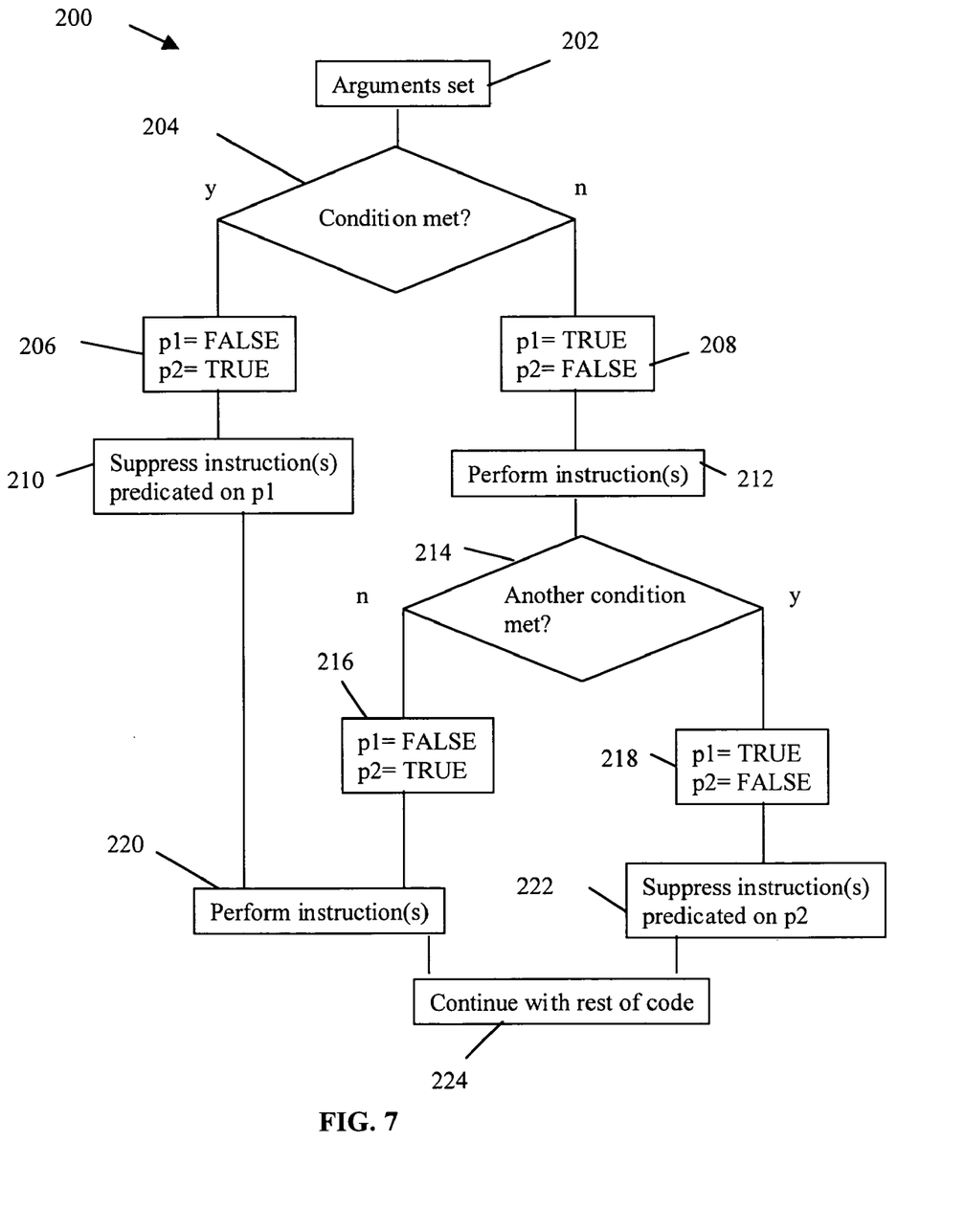
FIG. 7 is a flow chart of a fourth embodiment of the present invention.

When another pair of nullification instructions are encountered in the translation the method undertakes the same process. When a single nullification instruction is encountered, that is, on not in a pair the process 220 of FIG. 6 is conducted. The process begins at 222. At 224 instruction(s) IA64_Ix semantically equivalent to instruction PA_Ix is/are determined. One of the determined instructions IA64_Ix is a conditional instruction in which p1 is set to FALSE if the condition is met. Again the p2 may be set to TRUE if the condition is met. Again it is typical if the condition is not met that p1 will be set to TRUE and p2 will be set to FALSE, however this is not material in this example. At step 226 the translator determines the PBISA equivalent(s) of PA_Iy, that is converted instruction(s) IA64_Iy. In step 28 instructions IA64_Iy are predicated on p1. Rather than always predicating the converted instruction(s) following a non pair nullification instruction on p1, p1 and p2 can be alternated to be in synchronization with the swapping of p1 and p2 in paired nullification instructions. A further embodiment of the invention is described in relation to FIG. 7. FIG. 7 shows a method 200 of using predication to control the microprocessor 102 of FIG. 1. The method 200 begins with certain arguments being set 202 by earlier execution of code. A condition is tested at 204 If the condition is met as determined by the values in the arguments then predicate register p1 is set to FALSE and predicate register p2 is set to TRUE. If the condition is not me p1=TRUE and p2=FALSE. One or more first instructions are predicated on p1, so if p1=FALSE they are suppressed at 210. The process jumps to 220.

If p1=TRUE the first instructions are executed at 212.

Within the first instructions another condition may be determined at 214. If this condition is met p1=FALSE and p2=TRUE, otherwise p1=TRUE and p2=FALSE.

One or more second instructions may be predicated on p2, so if p2=FALSE they are suppressed at 222. Otherwise if p2=TRUE the second instructions are executed at 224.

It may be unnecessary to change the values of p1 and p2 if the second condition is met as they will already be p1=TRUE and p2=FALSE as a result of the first condition being met.

It will be appreciated that the actual states of the predicate registers may be set differently based on the determined conditions, depending on the implementation of the invention. For example if the condition if not met they could be set to p1=FALSE and p2=TRUE.

The present invention solves problems associated with:

1) The register pressure for predicate registers in dynamically generated nullifying code is drastically reduced.

2) Time required by the dynamic binary translator to manage predicate registers is reduced.

3) The number of predicate registers which have to be initialised at the beginning of execution of a basic block to ensure correctness is reduced, thus improving overall application performance.

The present invention provides the following advantages:

1) The number of predicate registers needed for emulation of nullification in a whole basic block is reduced to just 2.

2) Since the number of predicate registers that have to be live at the entry of the basic block are just two, the time required to initialise them is very small. This time reduction when accumulated for all the basic blocks being translated in the DBT results in overall reduction in application execution time.

3) No elaborate book-keeping and register allocation is needed during translation This increases the performance of the dynamic translator.

In the above examples PA_RISC has been used as an example of NBISA. It will be appreciated that other microprocessors may be categorized as NBISA by persons skilled in the art. In the above examples the Intel Itanium processor has been used as an example of PBISA. It will be appreciated that other microprocessors may be categorized as PBISA by persons skilled in the art.

The foregoing description of the exemplary embodiments is provided to enable a person skilled in the art to make or use the present invention. While the invention has been described with respect to particular illustrated embodiments, various modifications to these embodiments will readily be apparent to those skilled in the art, and the generic principles defined therein may be applied to together embodiments without departing from the spirit or scope of the invention, It is therefore desired that the present embodiments be considered in all respects as illustrative and not restrictive.

Accordingly, the present invention is not intended to be limited to the embodiments described above but is to be accorded the widest scope consistent with the principles and novel features disclosed herein.

The invention claimed is:

1. A method of controlling an operation of a processing device that comprises at least a first and second predicate execution registers, the method comprising:

predicating a first instruction on the first predicate execution register;

predicating a second instruction on the second predicate execution register;

setting the first predicate execution register based on a condition, wherein the condition is determined before the first instruction executes;

setting the second predicate execution register to an inverse of the first of the predicate execution registers; and setting the first and second predicate execution registers based on another condition determined before the second instruction executes, wherein the other condition is determined by the execution of the first instruction.

2. A computer program arranged to control a computerized system to operate the methods of claim 1.

3. A computer readable storage medium arranged to store a computer program as defined in claim 2.

4. A method of controlling an operation of a processing device that comprises two predicate execution registers, the method comprising:

determining a condition;

setting a first of the predicate execution registers to a first state based on the condition;

setting a second of the predicate execution registers to a second state which is different to the first state;

suppressing determination of another condition on the first predicate execution register, such that the determination of the other condition is suppressed in the event that the first predicate register is in the first state; and determining the other condition, setting the first predicate execution register to the second state based on the other condition and setting the second predicate execution register to the first state, in the event that the determination of the other condition is not suppressed.

5. A method according to claim 4, wherein one or more processing device instructions are suppressed based on the second predicate execution register.

6. A method according to claim 4, wherein the second state is the inverse of the first state.

7. A method of translating instructions in code executable on a nullification based instruction set architecture (NBISA) into predicate based instruction set architecture (PBISA) instructions, comprising:

converting a nullifying NBISA instruction into one or more semantically equivalent PBISA instructions, wherein one of the instructions sets a first predicate register to a first state in the event that a condition is met;

predicating all PBISA instructions converted from a NBISA instruction immediately following the nullifying NBISA instruction to one or more semantically equivalent PBISA instructions, such that the PBISA instructions will be suppressed if the first predicate register is set to a second state;

converting subsequent nullifying NBISA instructions into a group of one or more semantically equivalent PBISA instructions, wherein one of the instructions in each group of instructions sets a selected predicate register to the first state in the event that a condition is met, the selected predicate register being one of the first predicate register or a second predicate register; and predicating all corresponding PBISA instructions converted from a NBISA instruction immediately following the respective subsequent nullifying NBISA instruction to one or more corresponding semantically equivalent instructions, such that the corresponding PBISA instructions will be suppressed if the respective selected predicate register is set to the first state;

wherein the respective predicate register is selected such that the same predicate register is not selected in a row where one nullification instruction is immediately followed by another.

8. A method according to claim 7, wherein the respective predicate register is selected by alternating the predicate register selected with each nullification instruction.

9. A method according to claim 7, wherein the respective predicate register is selected by alternating the predicate register selected for pairs of nullification instructions, but for non paired nullification instructions the first predicate register is selected.

10. A method according to claim 7, wherein the respective predicate register is selected by alternating the predicate register selected for pairs of nullification instructions, but for non paired nullification instructions the second predicate register is selected.

11. A method of translating instructions in code executable on a nullification based instruction set architecture (NBISA) into predicate based instruction set architecture (PBISA) instructions, comprising:

providing at least one nullifying NBISA instruction in the code;

converting each nullifying NBISA instructions into one or more semantically equivalent PBISA instructions, wherein one of the instructions sets a selected predicate register to a first state in the event that a condition is met, the selected predicate register being one of a first predicate register or a second predicate register; and predicating all corresponding PBISA instructions converted from a NBISA instruction immediately following the respective nullifying NBISA instruction to one or more corresponding semantically equivalent instructions, such that the corresponding PBISA instructions will be suppressed if the respective selected predicate register is set to the first state;

wherein the respective predicate register is selected such that the same predicate register is not selected in a row where one nullification instruction is immediately followed by another.

12. A method of translating NBISA instructions into PBISA instructions, where there are at least two sequential nullifying instructions, comprising:

providing at least two sequential nullifying NBISA instructions (first and second instructions) and a third NBISA instruction immediately following the first and second instructions;

determining one or more first PBISA instructions semantically equivalent to the first NBISA instruction, wherein the first determined instructions comprise a PBISA instruction which upon execution sets a first predicate register to a first state if a condition is met;

determining one or more second PBISA instructions semantically equivalent to the second NBISA instruction, wherein the second determined instructions comprise a PBISA instruction which upon execution sets a second predicate register to a second state if another condition is met;

predicating the second determined instructions on the first predicate register, such that the second determined instructions do not execute in the event that the first predicate register is set to the first state at the time of execution;

determining one or more third PBISA instructions semantically equivalent to the third NBISA instruction; and predicating the third determined instructions on the second predicate register, such that the third determined instructions do not execute in the event that the second predicate register is set to the second state at the time of execution.

13. A method according to claim 12, wherein the second predicate register is set to inverse of the first state when the first predicate register is set.

14. A method according to claim 12, wherein the first predicate register is set to the inverse of the second state when the second predicate register is set.

15. A method according to claim 12, wherein if the respective condition is not met the respective predicate registers are set to the opposite setting when the condition is met upon execution of the respective instruction.

16. A method according to claim 12, wherein in determining the third PBISA instruction(s) semantically equivalent to the third NBISA instruction, the third determined instructions comprise a PBISA instruction which upon execution sets a first predicate register to the first state in the event that the third NBISA instruction is a nullifying instruction.

17. A method according to claim 12, wherein subsequent NBISA instructions include two sequential nullifying instructions (fourth and fifth instructions) immediately followed by a sixth instruction, and the method further comprises:

determining one or more fourth PBISA instructions semantically equivalent to the fourth NBISA instruction, wherein the fourth determined instructions comprise a PBISA instruction which upon execution sets the first predicate register to a first state if a condition is met;

determining one or more fifth PBISA instructions semantically equivalent to the fifth NBISA instruction, wherein the fifth determined instructions comprise a PBISA instruction which upon execution sets the second predicate register to the second state if another condition is met;

predicating the fifth determined instructions on the first predicate register, such that the fifth determined instructions will not execute in the event that the first predicate register is set to the first state at the time of execution;

determining one or more sixth PBISA instructions semantically equivalent to the sixth NBISA instruction; and predicating the sixth determined instructions on the second predicate register, such that the sixth determined instructions will not execute in the event that the second predicate register is set to the second state at the time of execution.

18. A method according to claim 17, wherein subsequent NBISA instructions include a nullifying instruction (fourth instruction) immediately followed by a non nullifying instruction (fifth instruction), and the method further comprises:

determining one or more fourth PBISA instructions semantically equivalent to the fourth NBISA instruction, wherein the fourth determined instructions comprise a PBISA instruction which upon execution sets the first predicate register to the first state if another condition is met;

determining one or more fifth PBISA instructions semantically equivalent to the fifth NBISA instruction; and predicating the fifth determined instructions on the first predicate register, such that the fifth determined instructions will not execute in the event that the first predicate register is set to the first state at the time of execution.

19. A method according to claim 12, wherein at least a fourth NBISA instruction immediately follows the first three NBISA instructions and the method further comprises:

inspecting the third of the NBISA instructions to determine if it is an instruction which nullifies the fourth instruction if a condition is met, wherein in the step of determining third semantically equivalent PBISA instruction(s) to the third NBISA instruction, the third determined instructions comprise a PBISA instruction which upon execution sets the first predicate register to the first state if another condition is met in the event that the third NBISA instruction is nullifying;

determining one or more fourth PBISA instructions semantically equivalent to the fourth NBISA instruction; and predicating the fourth determined instructions on the first predicate register in the event that the third NBISA instruction is nullifying, such that the fourth determined instructions will not execute in the event that the first predicate register is set to the first state at the time of execution.

20. A method of translating NBISA instructions into PBISA instructions, comprising:

providing at least three sequential NBISA instructions;

inspecting the first of the NBISA instructions to determine if it is an instruction which nullifies the second NBISA instruction if a condition is met;

determining one or more first PBISA instructions semantically equivalent to the first NBISA instruction, wherein the first determined instructions comprise a PBISA instruction which upon execution sets a first predicate register to a first state if a condition is met in the event that the first NBISA instruction is nullifying;

inspecting the second of the NBISA instructions to determine if it is an instruction which nullifies the third NBISA instruction if a condition is met;

determining one or more second PBISA instructions semantically equivalent to the second NBISA instruction, wherein the second determined instructions comprise a PBISA instruction which upon execution sets a second predicate register to the second state if another condition is met in the event that the second NBISA instruction is nullifying;

predicating the second determined instructions on the first predicate register in the event that the first NBISA instruction is a nullifying instruction, such that the second determined instructions will not execute in the event that the first predicate register is set to the first state at the time of execution;

determining third semantically equivalent PBISA instruction(s) to the third NBISA instruction; and predicating the third determined instructions on the second predicate register in the event that the second NBISA instruction is a nullifying instruction, such that the third determined instructions will not execute in the event that the second predicate register is set to the second state at the time of execution.

21. A method of translating NBISA instructions to PBISA instructions, comprising:

identifying pairs of nullification instructions such that a pair of nullification instructions is where there are two nullification instructions in a row and counting of pairs begins at the first nullification instruction;

converting the first nullification instruction of each pair into first semantically equivalent PBISA instructions, which comprise a conditional instruction that sets a first predicate register to a first state if a condition is met;

converting the second nullification instruction of each pair into second semantically equivalent PBISA instructions comprising a conditional instruction that sets a second predicate register to a second state if a condition is met;

predicating each second PBISA instruction on the first predicate register;

predicating each next converted instruction's converted first PBISA instructions on the second predicate register where each next NBISA instruction is the first of another pair of nullification instructions; and converting the next instruction following each pair of nullification instructions into third first semantically equivalent PBISA instructions and predicating each next converted instruction's converted third PBISA instruction on the second predicate register where each next NBISA instruction is not the first of another pair of nullification instructions.

22. A method according to claim 21, wherein converting the next instruction following each pair of nullification instructions into third first semantically equivalent PBISA instructions and predicating each next converted instruction's converted third PBISA instruction on the second predicate register where each next NBISA instruction is not the first of another pair of nullification instructions comprises:

identifying whether the instruction following the pair of nullification instructions is a non paired nullification instruction; and in the event that the next NBISA instruction is a nullification instruction, but not a member of a pair of nullification instructions, converting the nullification instruction into semantically equivalent PBISA instructions comprising a conditional instruction that sets the first predicate register to the first state if a condition is met and predicating the following instruction on the first predicate register.

23. A method according to claim 21, wherein the method further comprises converting the remaining NBISA instructions into semantically equivalent PBISA instructions.

24. An apparatus for translating nullification instructions in code executable on a NBISA into PBISA instructions, comprising:

translator means for converting nullifying NBISA instructions into one or more semantically equivalent PBISA instructions, wherein one of each of the converted instructions sets a selected predicate register to a first state in the event that a condition is met;

predication means for predicating all PBISA instructions converted to one or more semantically equivalent instructions from respective NBISA instructions immediately following the corresponding nullifying NBISA instruction, such that each set of respective converted PBISA instructions will not execute if the respective selected predicate register is set to the first state; and selection means for selecting the respective predicate register such that the same predicate register is not selected in a row where one nullification instruction is immediately followed by another.

25. An apparatus for translating NBISA instructions into PBISA instructions, comprising:

- means for receiving at least three sequential NBISA instructions, wherein the first and second instructions are nullifying instructions;
- a translator arranged to determine one or more first PBISA instructions semantically equivalent to the first NBISA instruction, wherein the first determined instructions comprise a PBISA instruction which upon execution sets a first predicate register to a first state if a condition is met;
- wherein the translator is also arranged to determine one or more second PBISA instructions semantically equivalent to the second NBISA instruction, wherein the second determined instructions comprise a PBISA instruction which upon execution sets a second predicate register to the first state if another condition is met;
- wherein the translator is further arranged to determine one or more third PBISA instructions semantically equivalent to the third NBISA instruction;
- wherein the translator is arranged to predicate the second determined instructions on the first predicate register;
- wherein the translator is arranged to predicate the third determined instructions on the second predicate register.

* * * * *